United States Patent Office 3,283,013
Patented Nov. 1, 1966

3,283,013
PROCESS FOR THE PREPARATION OF 2,3-DIBROMO-1-PROPANOL
Robert W. Rimmer, Pennsville, N.J., assignor to E. I. du Pont de Nemours and Company, Wilmington, Del., a corporation of Delaware
No Drawing. Filed June 28, 1962, Ser. No. 205,833
2 Claims. (Cl. 260—633)

This invention relates to a process for the preparation of 2,3-dibromo-1-propanol by the addition bromination of allyl alcohol, and particularly to an improved process which provides higher yields of 2,3-dibromo-1-propanol of improved quality and suppresses the production of undesired by-products.

2,3-dibromo-1-propanol is a valuable intermediate for incorporating a flame retarding dibromopropyl group into plastics, resins, fibers, and the like. Such incorporation may be done, for example, by mixing a compatible ester of 2,3-dibromo-1-propanol with the material to be rendered flame retardant or by building the 2,3-dibromopropyl group into the structure of the material by polymerizing or copolymerizing an olefinically unsaturated ester of 2,3-dibromo-1-propanol, e.g. the acrylate or the methacrylate. 2,3-dibromopropyl esters of phosphoric, pyrophosphoric and 2,3-dibromopropylphosphonic acids are flame retarding agents for plastics, fibers, resins, and lacquers. They are highly compatible, for example, with polyacrylonitrile and are soluble in aromatic, halogenated aromatic, and halogenated aliphatic solvents. Also, the 2,3-dibromopropyl esters of hydrocarbon carboxylic acids, particularly the esters of the lower alkanoic acids, are flame retardant agents.

2,3-dibromo-1-propanol has been made by the addition bromination of allyl alcohol. In the course of such bromination by prior processes, there is formed considerable quantities of high-boiling brominated alcohol-ethers, 1,2,3-tribromopropane, hydrogen bromide, and minor quantities of thermally unstable compounds. Usually, this crude 2,3-dibromo-1-propanol cannot be used directly, either in application by itself or in the synthesis of esters or other derivatives of the quality and purity required for many purposes. Therefore, it is usually necessary to purify the 2,3-dibromo-1-propanol by additional and costly procedures, such as distillation. Similar and additional difficulties have been encountered in attempting to prepare 2,3-dibromopropyl esters by the bromination of the allyl esters, such as triallyl phosphate and diallyl allylphosphonate. The 2,3-dibromopropyl esters of unsaturated acids, such as the acrylate and the methacrylate, cannot be obtained by bromination of the corresponding allyl esters of those acids because the bromine also adds on to the unsaturated groups of the acid radicals.

It is an object of this invention to provide an improved process for the addition bromination of allyl alcohol. Another object is to provide a process by which 2,3-dibromo-1-propanol of improved quality is obtained in high yields. A further object is to provide such a process which employs agents that suppress side reactions and the production of troublesome by-products, whereby 2,3-dibromo-1-propanol is obtained in a substantially pure condition. Still further objects are to improve the art. Still other objects will appear hereinafter.

The above and other objects of this invention may be accomplished by the addition bromination of
 (a) Allyl alcohol,
 (b) At a temperature of about —20° C. to 100° C.,
 (c) With about 1 mol of elemental bromine for each mol of the allyl alcohol,
 (d) In the presence of about 5% to about 50% by weight, based on the allyl alcohol, of a metal compound of the group consisting of the halides of lithium and the hydrated halides of Be, Mg, Ca, Sr, Cd and Ba in which halides the halogen has an atomic number of 17–35,
 (e) In about 50% to about 500% by volume, based on the allyl alcohol, of a liquid, inert, non-polar organic solvent having a normal boiling point in the range of about —20° C. to about 185° C.

It has been found that, by operating the process in the manner above defined, the disadvantages of the prior processes are largely overcome. The metal halides of the specified class suppress side reactions and the formation of troublesome by-products and impurities, and promote the desired reaction so as to materially increase the yields of the 2,3-dibromo-1-propanol. The yield of desired 2,3-dibromo-1-propanol usually exceeds 90%, and the yield of by-product tribromopropane is usually less than 0.5%. Usually, the 2,3-dibromo-1-propanol is sufficiently pure so that it is usable as produced without further purification. If one does choose to distill the 2,3-dibromo-1-propanol so produced, yields of about 90% or more of pure 2,3-dibromo-1-propanol are obtained. Also, this invention provides a simple one-vessel process of high volume output.

The brominating agent is elemental bromine, usually a commercial grade of liquid bromine having a purity of about 99.5%. The bromine will be used in a proportion of about 1 mol for each mol of the allyl alcohol. Also, a commercial grade, as well as a highly refined, allyl alcohol may be used.

The bromination process of this invention may be carried out at temperatures of from about —20° C. to 100° C. Below —20° C., the reaction becomes excessively slow; and above 100° C., the formation of tribromopropane as a by-product increases to such an extent that the effect of the metal halide promoter in suppressing the formation of such by-product is lost. In general, temperatures above about 30° C. should be avoided as the effect of the promoter is diminished as the temperature is increased above 30° C. although the promoter will show a distinctly improved effect on the reaction at temperatures of 30° C.–100° C. Usually, the process will be carried out at temperatures of from about —10° C. to about 30° C., and preferably from about 5° C. to about 25° C.

For obtaining the advantages of this invention, it is essential that the reaction take place in the presence of a metal compound of the group consisting of the halides of lithium and the hydrated halides of Be, Mg, Ca, Sr, Cd and Ba, in which halides the halogen has an atomic number of 17–35, that is, is bromine or chlorine. Mixtures of two or more of such metal compounds may be used. Preferably, the bromides will be used, and particularly calcium bromide dihydrate, $CaBr_2 \cdot 2H_2O$.

The metal halides that will be used as promoters for the bromination of allyl alcohol include $LiBr$, $LiCl$, $LiCl \cdot H_2O$, $BeCl \cdot 4H_2O$, $CaBr_2 \cdot 2H_2O$, $CaBr_2 \cdot 3H_2O$, $CaCl_2 \cdot 2H_2O$, $CaCl_2 \cdot 6H_2O$, $MgBr_2 \cdot 6H_2O$, $MgCl_2 \cdot 6H_2O$, $SrCl_2 \cdot 2H_2O$, $SrCl_2 \cdot 6H_2O$, $SrBr_2 \cdot 6H_2O$, $BaBr_2 \cdot 2H_2O$, $BaCl_2 \cdot 2H_2O$, $CdBr_2 \cdot 4H_2O$, $CdCl_2 \cdot 2.5H_2O$, and $CaBr_2 \cdot 6H_2O$.

The results obtained are specific to the recited classes of metal compounds. Halides of metals such as copper, iron, sodium, potassium, rubidium, and cesium are ineffective to produce the advantages of this invention. $TiCl_4$, $AlCl_3$, and the like cannot be used in the process of this invention because they form alcoholotes.

The metal compound should be employed in a concentration of from about 5% to about 50% by weight based on the allyl alcohol. An amount materially less than about 5% generally will have little discernible effect and not have practical value, while amounts up to 50% and above will be found to promote the desired bromination with high effectiveness, but amounts materially above 50% usually will be uneconomical and require the use of excessively large volumes of solvent. The preferred amount of the metal compound will vary with the metal compound, and the reaction conditions, e.g. the amount of solvent present and the temperature. Usually, the metal compound will be used in a concentration of from about 5% to about 34% by weight based on the allyl alcohol, preferably from about 10% to about 25%. The preferred amount of calcium bromide dihydrate is from about 15% to about 20% by weight. With the lower amounts of solvent and at the higher reaction temperatures (i.e. 50° C. to 100° C.), more metal halide is required than with the larger amounts of solvent and at the lower operating temperatures.

Solvents are generally employed in the new bromination process to increase the fluidity of the reaction mass for working at preferred lower temperatures than otherwise are possible and for improving the heat transfer through the reaction medium. The bromination is an exothermic reaction, and heat must be removed to hold the temperature at a constant level. In the absence of a solvent, the reaction temperature must be raised to reduce the viscosity of the reaction mass for adequate agitation and proper heat transfer and, as the reaction temperature is raised, the yield of 2,3-dibromo-1-propanol tends to decrease and the quality of the product may be impaired. A solvent suitable for use in the process is a liquid, inert, non-polar organic solvent which has a normal boiling point in the range of about −20° C. to about 185° C., usually about 60° C. to about 130° C. Polar solvents, having such groups as hydroxyl, thiol, carboxy, carbonyl, formyl, amino, alkylamino (—NHR) and the like, which react with or cause the solvent containing them to react with bromine or with intermediates in the bromination reaction, are excluded. In general, it will be preferable to employ a solvent which is liquid at atmospheric pressure at the prevailing reaction temperature to avoid the use of pressure equipment, and also to employ a solvent which does not have an excessively high boiling point and can be easily removed when required. However, solvents, having normal boiling points below the reaction temperature employed, can be used under elevated pressures sufficient to maintain them in the liquid state. Solvents which may be used to provide the advantages of this invention without adverse effect include aromatic hydrocarbons such as benzene, toluene, xylene; halogenated aromatic hydrocarbons such as chlorobenzene, dichlorobenzenes, mono-bromobenzene, chlorotoluence, bromotoluene; and halogenated alkanes, such as chloroform, carbon tetrachloride, 1,2-difluorotetra chloroethane. Mixtures of these solvents may also be used.

The solvent will be employed in a proportion of from about 50% to about 500% by volume, based on the allyl alcohol, preferably from about 100% to about 200% by volume.

The general procedure for conducting the novel process of this invention is relatively simple. A reaction vessel may be charged with the allyl alcohol, the solvent, and the metal halide promoter, and the bromine gradually added thereto, usually under nitrogen, while the temperature of the reaction mass is held within the desired range. Usually, it will be desirable to add the allyl alcohol and the bromine simultaneously to the solvent containing the metal compound. Preferably, a minor proportion of the allyl alcohol is charged to the reactor with the solvent and the metal compound to aid the solution of the metal compound, and then the balance of the allyl alcohol is fed gradually into the reactor simultaneously with the bromine.

Also, the process may be operated continuously, that is, by feeding the allyl alcohol and the bromine continuously, for example, to a stream of solvent containing the metal halide promoter and some of the allyl alcohol, maintained at the desired temperature, and continuously withdrawing the reaction mixture. An alternate procedure to further illustrate a continuous process is to feed the allyl alcohol containing the metal compound to a solvent stream containing the bromine, and continuously withdrawing the reaction mixture.

Usually, it is desirable to avoid contamination of the reaction mixture with ammonia, acidic fumes and excess moisture which may be present in the atmosphere from other nearby operations, by operating under an inert atmosphere. Therefore, it is usually preferred to carry out the reaction under a blanket of nitrogen.

In order to more clearly illustrate this invention, preferred modes of carring it into effect and the advantageous results to be obtained thereby, the following example is given in which the parts and proportions are by weight except where specifically indicated otherwise.

*Example*

A glass-lined reaction vessel was charged with 400 parts of carbon tetrachloride, 16 parts of allyl alcohol, and 40 parts of calcium bromide dihydrate, and the mixture was cooled to 20° C. and placed under nitrogen. This portion of the allyl alcohol aided the solution of the calcium bromide dihydrate. To the mixture was then added simultaneously 102 parts of allyl alcohol and 320 parts of bromine over a period of about an hour keeping the temperature of the reaction mass between 20° C. and 25° C. and the mixture blanketed with nitrogen. The reaction mass was washed twice with water, and the solvent vacuum-stripped from the product. The product was then fractionally distilled at 2 mm. of mercury pressure. After removal of two parts of foreshot, 391 parts (90% of the theoretical yield) of pure, colorless 2,3-dibromo-1-propanol, B.P. 70° C. to 73° C. at 2 mm. pressure was obtained. By gas chromatography, the 2,3-dibromo-1-propanol was identified and found to have a purity of 99.9%. The residue amounted to 16 parts or 3.7% of the theoretical yield of 2,3-dibromo-1-propanol.

A repetition of the above procedure in the absence of the calcium bromide dihydrate gave 83.1% yield of 2,3-dibromo-1-propanol and a 10.3% residue. A comparison of the results of the two reactions shows a distinct, beneficial promoting action of the calcium bromide dihydrate to provide a significantly higher yield of desired product.

When the above procedure was repeated with 6 parts of calcium bromide dihydrate at a temperature of 10±2°C., the yield of 2,3-dibromo-1-propanol was 88.5%, and the residue amounted to 6%. The lesser amount of calcium bromide dihydrate has given a lower yield of product, but it is still definitely higher than the yield in the absence of the promoter.

A substitution of 11.8 parts of lithium bromide for the 6 parts of calcium bromide dihydrate in the last described procedure resulted in a yield of 90% 2,3-dibromo-1-propanol and a residue of 4.6%.

The use of 165 parts of chlorobenzene in place of the carbon tetrachloride and 20 parts of calcium bromide dihydrate as a bromination promoter in the above procedure conducted at 10° C. gave a 93% yield of 2,3-dibromo-1-propanol and only a 3.7% production of by-products.

It will be understood that the preceding example has been given for illustrative purposes solely and that the invention is not limited to the specific embodiments described therein. On the other hand, it will be readily apparent to those skilled in the art that, subject to the limitations set forth in the general description, many variations can be made in the materials, proportions, and conditions employed, without departing from the spirit and scope of this invention.

From the foregoing description, it will be apparent that this invention provides a novel and improved process for the addition bromination of allyl alcohol, which results in higher yields of the 2,3-dibromo-1-propanol of improved purity and quality. Such process overcomes the difficulties of the prior art processes and particularly suppresses side reactions and the formation of troublesome by-products. The process is simple and readily carried out in a single vessel with a high volume output. Accordingly, it will be apparent that this invention constitutes a valuable advance in and contribution to the art.

The embodiments of the invention in which an exclusive property or privilege is claimed are defined as follows:

1. The process for the preparation of 2,3-dibromo-1-propanol which comprises
   (a) brominating allyl alcohol,
   (b) at a temperature of about −20° C. to 100° C.,
   (c) with about 1 mol of elemental bromine for each mol of the allyl alcohol,
   (d) in the presence of about 5% to about 50% by weight, based on the allyl alcohol, of calcium bromide dihydrate,
   (e) in about 50% to about 500% by volume, based on the allyl alcohol, of a liquid, inert, non-polar organic solvent having a normal boiling point in the range of about −20° C. to about 185° C.

2. The process for the preparation of 2,3-dibromo-1-propanol which comprises
   (a) brominating allyl alcohol,
   (b) at a temperature of about 5° C. to about 25° C.,
   (c) with about 1 mol of elemental bromine for each mol of allyl alcohol,
   (d) in the presence of about 15% to about 20% by weight, based on the allyl alcohol, of calcium bromide dihydrate,
   (e) in about 100% to about 200% by volume, based on the allyl alcohol, of a liquid, inert, non-polar organic solvent having a normal boiling point in the range of about 60° C. to about 130° C.

References Cited by the Examiner
FOREIGN PATENTS

| | | |
|---|---|---|
| 570,374 | 7/1945 | Great Britain. |
| 1,089,743 | 9/1960 | Germany. |

LEON ZITVER, *Primary Examiner.*

J. E. EVANS, M. B. ROBERTO, *Assistant Examiners.*